(12) United States Patent
Nonaka

(10) Patent No.: US 6,840,722 B1
(45) Date of Patent: Jan. 11, 2005

(54) MACHINING APPARATUS AND MACHINING METHOD

(75) Inventor: Hiroki Nonaka, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 129 days.

(21) Appl. No.: 09/722,881

(22) Filed: Nov. 28, 2000

(30) Foreign Application Priority Data

Nov. 29, 1999 (JP) ............................................ 11-338749

(51) Int. Cl.$^7$ .............................. B23C 3/02; B23B 1/00; B23P 15/00

(52) U.S. Cl. ........................... 409/132; 409/66; 409/74; 409/78; 409/165; 409/200; 451/211; 451/246; 451/400; 82/1.11; 82/1.2; 82/1.4; 29/898.042; 29/898.054

(58) Field of Search ................. 409/74, 200, 131–132, 409/144, 191, 190, 165, 66, 70, 78; 82/1.11, 1.2–1.4; 451/211, 246, 400; 29/898.042, 898.054, 898.13

(56) References Cited

U.S. PATENT DOCUMENTS

| | | | |
|---|---|---|---|
| 2,199,379 A | | 5/1940 | Tornebohm |
| 2,572,021 A | * | 10/1951 | Folz ........................ 29/898.054 |
| 3,114,294 A | * | 12/1963 | Wright ........................ 409/200 |
| 3,383,988 A | | 5/1968 | Grueninger |
| 3,554,082 A | | 1/1971 | Faulcon |
| 4,648,295 A | * | 3/1987 | Ley et al. .................... 451/211 |
| 4,706,529 A | * | 11/1987 | Hawle .......................... 409/132 |
| 4,883,392 A | * | 11/1989 | Lieser ......................... 409/165 |
| 4,934,040 A | * | 6/1990 | Turchan ......................... 409/74 |
| 4,942,695 A | * | 7/1990 | Wedeniwski ................. 451/246 |
| 5,022,293 A | * | 6/1991 | Farkas et al. ................. 82/1.11 |
| 5,465,474 A | | 11/1995 | Kimura et al. |
| 6,013,002 A | | 1/2000 | Nonaka |
| 6,106,364 A | | 8/2000 | Kruppke et al. |
| 6,257,810 B1 | * | 7/2001 | Schmitt ........................ 409/74 |
| 6,533,508 B1 | * | 3/2003 | Nonaka ....................... 409/132 |

FOREIGN PATENT DOCUMENTS

| | | |
|---|---|---|
| EP | 0 486 992 | 5/1992 |
| GB | 1 232 140 | 5/1971 |
| JP | 51-20295 | 2/1976 |
| JP | 59-201744 | 11/1984 |
| JP | A-63-34010 | 2/1988 |
| JP | A-63-212442 | 9/1988 |
| JP | 2-61520 | 5/1990 |
| JP | 4-125512 | 11/1992 |
| JP | A-11-207592 | 8/1999 |
| JP | 2000-308938 | 11/2000 |

* cited by examiner

*Primary Examiner*—A. L. Wellington
*Assistant Examiner*—Erica Cadugan
(74) *Attorney, Agent, or Firm*—Oblon, Spivak, McClelland, Maier & Neustadt, P.C.

(57) ABSTRACT

A machining apparatus for machining a workpiece by rotating and revolving either the workpiece or a tool 1 to contact with each other. The machining apparatus comprises rotation/revolution ratio setting motors M1 and M3 for setting a ratio of a number of rotations to a number of revolutions of the workpiece or the tool 1, to a numerical value having a fraction below a decimal point, by changing the number of revolutions. The workpiece is machined by setting the number of revolutions and the number of rotations at the ratio.

12 Claims, 12 Drawing Sheets

FIG.6

| DISCREPANCIES OF PERIOD | VALUES OF B | DISCREPANCIES OF K |
|---|---|---|
| 0 | 1 | 0 |
| 1/8 | 8 | 0.125 |
| 1/4 | 4 | 0.25 |
| 3/8 | 8 | 0.375 |
| 1/2 | 2 | 0.5 |
| 5/8 | 8 | 0.675 |
| 3/4 | 4 | 0.75 |
| 7/8 | 8 | 0.875 |
| 1 | 1 | 1 |

MACHINING APPARATUS AND MACHINING METHOD

BACKGROUND OF THE INVENTION

1. Field of the Invention

The present invention relates to a machining apparatus and a machining method for machining a workpiece by rotating a tool and the workpiece relatively and, more particularly, to an apparatus and a method for rotating and revolving either the tool or the workpiece.

2. Related Art

A machining operation such as a cutting or grinding operation is generally performed by rotating a tool and a workpiece relative to each other. For example, a boring operation or cutting operation is performed by running the tool along a cylindrical surface of the workpiece to cut an inner face of the cylindrical surface continuously; similarly, an end milling operation for cutting an inner face of a cylindrical surface is performed by rotating a tool having cutting blades on its outer circumference to cut the inner face of the cylindrical surface and by moving the tool in the circumferential direction along the cylindrical surface so as to change portions to be cut.

In the former boring operation, a cutting blade runs along the surface to be cut, so that the cutting operation is continuously performed to enhance the amount of cutting per unit time, i.e., the working efficiency, and a cut surface (or cut portion) is continuously formed to improve the roughness of a worked surface. Since the cutting blade is exposed to the cutting load at all times and is seriously heated to a high temperature, on the contrary, the cutting speed or the working efficiency is restricted by the life of the cutting blade. In other words, if the cutting conditions are set by considering the working efficiency preferentially, the tool is so seriously worn as to cause a problem that the cost of tools rises to raise the cost of the working operation.

In the latter end milling operation, on the other hand, an end mill is moved, while being rotated on its axis, in the circumferential direction of the cylindrical surface, so that its cutting operation is intermittently performed. The cutting blades are exposed to an impact load, but their edges are air-cooled, so that the temperature conditions for the cutting blade are moderated. On the contrary, the speed to move the end mill in the circumferential direction of the cylindrical surface is mechanically restricted so that the cutting speed cannot be especially raised to a high level. This invites a problem that the working efficiency is lowered although the cutting width can be enlarged and another problem that the intermittent cutting operation deteriorates the roughness of the worked surface. In order to improve the roughness of the worked surface, the circumferential moving speed of the end mill on the cylindrical surface may be lowered. Then, there arises a disadvantage that the working efficiency is further lowered.

In Japanese Patent Laid-Open No. 63-34010 (JP-A-63-34010), there is disclosed one example of the tool for performing the end milling operation having the aforementioned characteristics. The disclosed end mill is a roughing end mill, in which a helical groove and a helical cutting portion defined by this groove are formed in a stem portion of its body and in which undulating edges are formed in the cutting portion to have undulations shifted by a predetermined phase for each edge.

The roughing end mill of the prior art, as disclosed in the aforementioned Laid-Open, is constructed to transfer the waveforms of the cutting edges to the surface to be worked. The end mill performs the cutting operation by rotating on its center axis, as in ordinary end mills of prior arts, while revolving around the center of the surface to be worked, so as to change the portions to be cut. In this case, like the prior arts, the rotational speed is far higher than the moving speed of the end mill along the worked surface so that the cutting speed is substantially determined by the rotational speed of the end mill. This makes it difficult to improve the durability of the cutting blade and the working efficiency or the roughness of the worked surface at the same time.

SUMMARY OF THE INVENTION

A main object of the invention is to improve the durability of a tool, a working efficiency and a roughness of a worked surface in the case of a machining operation such as a cutting or grinding operation.

According to a machining apparatus or method of the invention, one of a workpiece and a tool is rotated on its axis and revolved (moved in an orbital manner) to contact with the other. The ratio of the number of rotations to the number of revolutions is given a numerical value having a fraction below a decimal point, i.e., a numerical value of a rational number. More specifically, one of the workpiece or the tool may make several rotations while the other makes one revolution, and that ratio is so set that ridges of undulations, as made on a worked surface, may overlap valleys of undulations to be formed on the worked surface during a subsequent revolution.

In the machining apparatus or method of the invention, therefore, the machining operation is performed by rotating and revolving the workpiece or the tool. Therefore, the workpiece is intermittently machined to form on the worked surface the valleys where the tool acts most deeply and the ridges between the valleys. By setting the ratio of the number of rotations to the number of revolutions at the numerical value having a fraction below the decimal point, on the other hand, ridges, as formed at the immediately preceding revolution, are worked as valleys or their portions at the current revolution, so that the ridges are less left to improve the roughness of the worked surface. Since the number of revolutions can be changed, moreover, the relative feed of the tool to the workpiece can be increased to improve the working efficiency.

In the machining apparatus or method of the invention, on the other hand, an amount of working (or workload) per unit time and a roughness of the worked surface can be preset to determine a rotation/revolution ratio on the basis of the amount of working per unit time and the roughness of the worked surface.

Thus, the speed of revolution can be optimized to improve the working efficiency and the roughness of the worked surface.

In the machining method of the invention, moreover, a cylindrical surface can be cut on the workpiece by rotating and revolving one of the cutting tool and the workpiece, and its inner face can be cut into undulations having continuous ridges and valleys. Therefore, the depth of the undulations can be suitably set to form oil sumps in the inner face of the cylindrical surface.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 6 is a diagram tabulating relations between the discrepancies of a cutting period of a predetermined cutting blade, values B of the number of revolutions performed untill the cutting period restores an original pitch, and the discrepancies of a rotation/revolution ratio K;

DETAILED DESCRIPTION OF THE PREFERRED EMBODIMENTS

Figure 1:
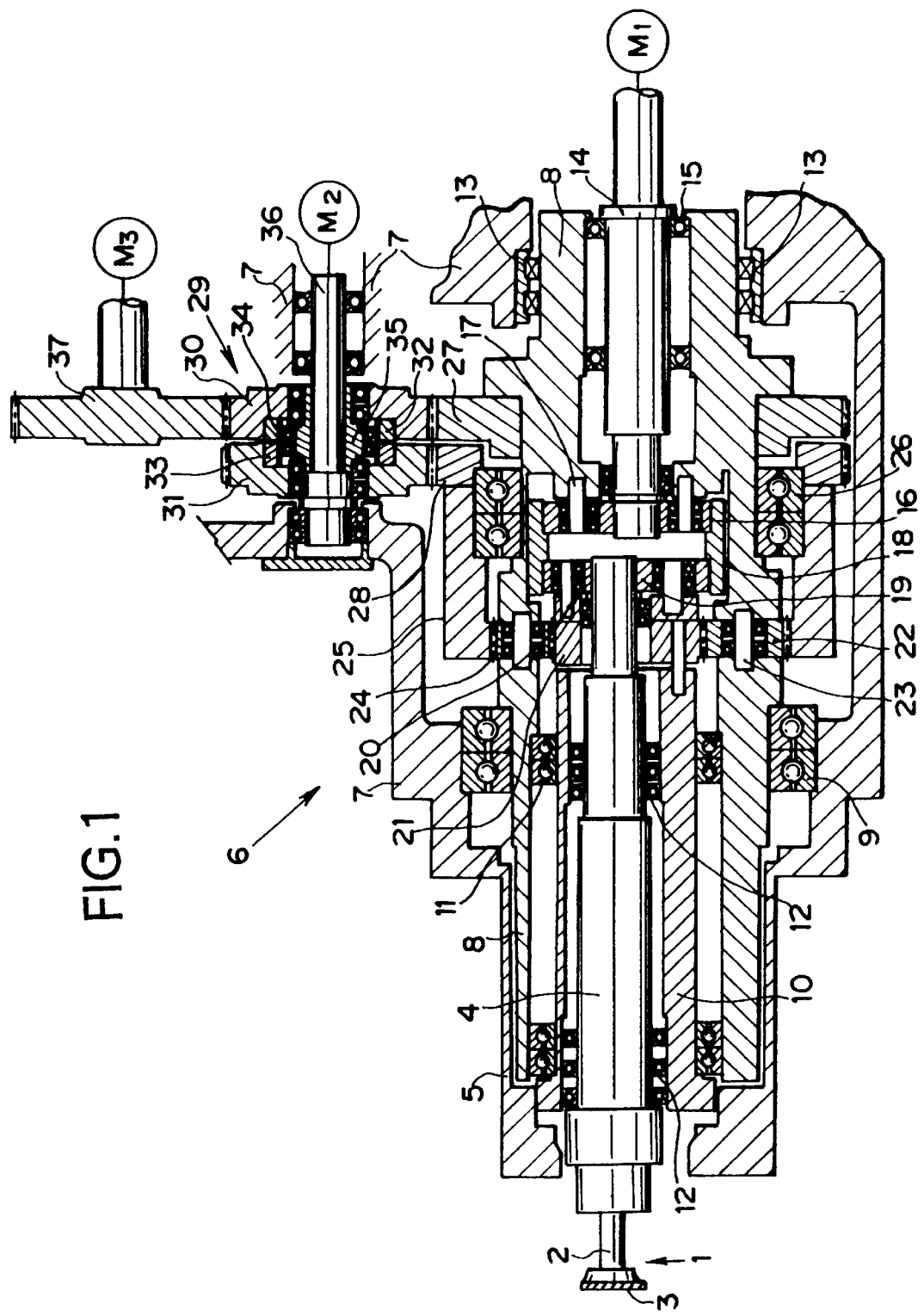
FIG. 1 is a sectional view showing one embodiment of a machining apparatus according to the invention.

The invention will be specifically described with reference to the accompanying drawings. First of all, a machining apparatus according to the invention is described by adopting a cutting apparatus as an example. In FIG. 1, a tool of a workpiece is held. The tool 1 is exemplified by a milling cutter having cutting blades 3 formed on the outer circumference of a leading end portion of a shank 2, and a spindle 4 having the tool 1 mounted in its leading end portion is arranged in a holding shaft 5. The holding shaft 5 is formed into a cylindrical shape and integrated with an entire housing (i.e., base portion) 7 of a cutting apparatus, as indicated by reference numeral 6 in FIG. 1. Therefore, the holding shaft 5 is moved with respect to a (not-shown) workpiece to be cut, but will not rotate on its axis.

In this holding shaft 5, a revolution shaft 8 is rotatably held by a bearing 9. In this revolution shaft 8, there is formed a bore, which is extended in the axial direction of and with an eccentricity to the axis of the revolution shaft 8 and in which an eccentric shaft 10 is rotatably held by a bearing 11. Therefore, this eccentric shaft 10 revolves around the axis of the revolution shaft 8 as this shaft 8 rotates on its axis. This eccentric shaft 10 is provided for changing radii of revolution of the spindle 4. In this eccentric shaft 10, there is formed a through bore, which is extended therethrough in the axial direction of and with an eccentricity to the axis of the eccentric shaft 10 and in which the spindle 4 is rotatably held by a bearing 12.

Figure 2:
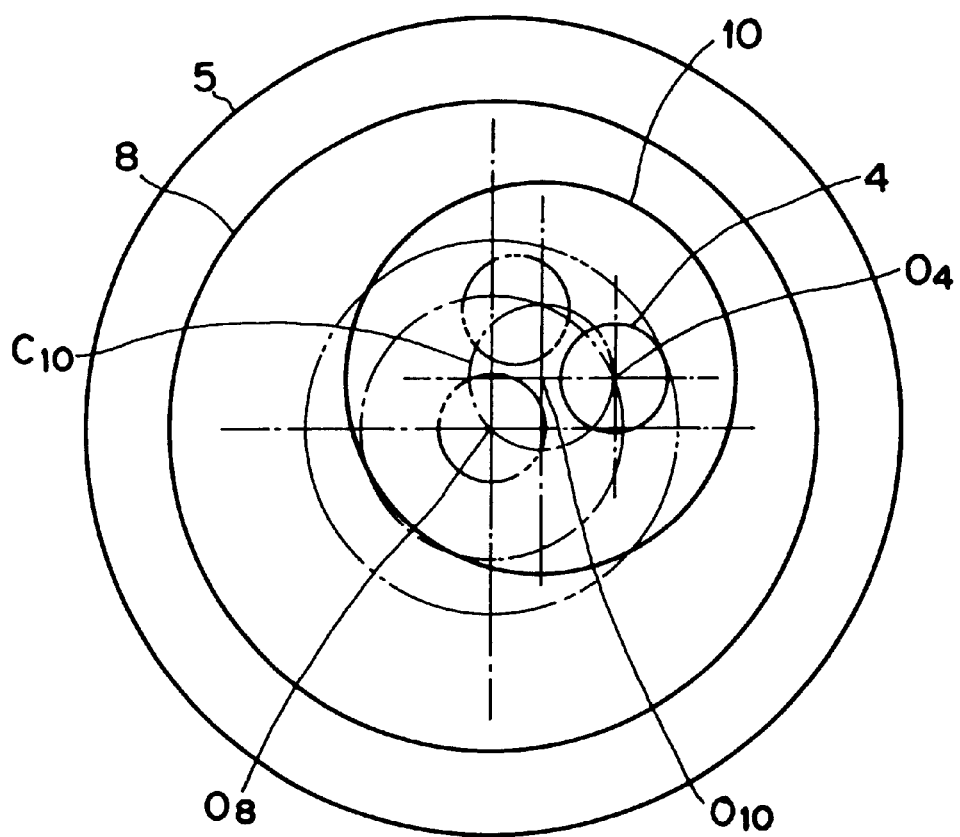
FIG. 2 is a diagram for explaining the relative positions, as taken in the radial directions, of a spindle, an eccentric shaft, a revolution shaft and a retaining shaft of the apparatus.

FIG. 2 shows the relative positions of the aforementioned individual shafts in the radial directions schematically. As shown, the revolution shaft 8 is arranged on the same axis as that of the holding shaft 5. In the revolution shaft 8, there is arranged the eccentric shaft 10 which has an axis $O_{10}$ at a position eccentric to the axis $O_8$ of the revolution shaft 8. The spindle 4, as rotatably arranged in the eccentric shaft 10, is positioned eccentrically to the axis $O_{10}$ of the eccentric shaft 10.

As the eccentric shaft 10 is rotated, therefore, the spindle 4, as located outside of the axis $O_{10}$ of the eccentric shaft 10, moves on a circumference $C_{10}$ which is centered on the axis $O_{10}$. When the eccentricity of the eccentric shaft 10 to the revolution shaft 8 and the eccentricity of the spindle 4 to the eccentric shaft 10 are equal, the axis $O_4$ of the spindle 4 may be aligned to the axis $O_8$ of the revolution shaft 8 to reduce the eccentricity of the spindle 4 to the revolution shaft 8 to zero. By rotating the eccentric shaft 10, more specifically, there is changed the eccentricity of the spindle 4, as arranged in the eccentric shaft 10, to the revolution shaft 8. When the eccentricity of the eccentric shaft 10 to the revolution shaft 8 and the eccentricity of the spindle 4 to the eccentric shaft 10 are equal, the eccentricity of the spindle 4 to the revolution shaft 8 is changed to zero or more within a limit of two times of the equal eccentricity.

The tool 1, as mounted in the spindle 4, rotates together with the spindle 4. Since this spindle 4 is held in the revolution shaft 8, on the other hand, the spindle 4, i.e., a tool 1 revolves around the axis $O_8$ of the revolution shaft 8 as the revolution shaft 8 rotates on its axis. In this case, The radius of revolution of the spindle 4 determines the eccentricity of the spindle 4 to the revolution shaft 8, which is set by rotating the eccentric shaft 10.

This revolution shaft 8 is extended at its righthand end portion, as seen in FIG. 1, to the rear end portion of the housing 7 and is rotatably supported by the housing 7 through a bearing 13 fitted on the outer circumference of its rear end portion. In the rear end portion of the revolution shaft 8, there is formed a concentric through hole, in which an input shaft 14 is rotatably held through a bearing 15. This input shaft 14 is provided for rotating the spindle 4 and is connected to a spindle motor M1. This spindle motor M1 is fixed on the housing 7 acting as the base portion. On the other hand, the input shaft 14 has its lefthand end portion extended in the revolution shaft 8 to a position close to the rear end portion of the spindle 4.

Moreover, a plurality of rollers 16 having different external diameters are arranged, being in contact with the outer surface of the input shaft 14, at the end portion of the input shaft 14. These rollers 16 are rotatably mounted on support pins 17 which are mounted on the revolution shaft 8 so as to be in parallel with the axis of the input shaft 14. Moreover, a cylindrical member 18 is fitted to enclose those rollers 16. Here, these rollers 16 are press-fitted between the cylindrical member 18 and the input shaft 14 to transmit the torque through a frictional force because their contact pressures are high.

The cylindrical member 18 encloses the outer circumference of the rear end portion of the spindle 4. Between this outer circumference of the spindle 4 and the inner circumference of the cylindrical member 18, there are press-fitted a plurality of rollers 19 having different external diameters like the aforementioned rollers 16. The rollers 19 are rotatably supported by support pins 20, which are connected to a ring-shaped gear 21 arranged rotatably around the outer circumference of the spindle 4 through a bearing. The ring-shaped gear 21 is further connected to the rear end portion of the aforementioned eccentric shaft 10 by pins.

Thus, the torque of the input shaft 14 is transmitted to the cylindrical member 18 by the rotations of the rollers 16 contacting with the outer circumference of the input shaft 14, and the torque of the cylindrical member 18 is transmitted to the spindle 4 by the rotations of the rollers 19 contacting with the inner circumference of the cylindrical member 18. In short, as the input shaft 14 is rotated by the motor M1, its torque is transmitted to rotate the spindle 4. As the individual rollers 16 and 19 revolve relative to one another, moreover, there is changed the eccentricity of the spindle 4 to the input shaft 14, namely, the revolution radius of the spindle 4.

In the portions of the revolution shaft 8 on the side of the outer circumference of the ring-shaped gear 21, there are formed a plurality of cut-away portions which are opened in the inner and outer circumferences and in which there are arranged intermediate gears 22 meshing with the ring-shaped gear 21. The thicknesses of the revolutionary shaft 8 at the individual portions, in which the intermediate gears 22 are arranged, are made different from one another because the axes of the bores extending in the axial direction are eccentric to the axis of the revolution shaft 8. Therefore, the external diameters of the individual intermediate gears 22 are made different according to the thicknesses of the revolution shaft 8 at those individual portions. In other words, the circle joining the outermost circumferences of the individual intermediate gears 22 is centered on the axis of the revolution shaft 8. Here, the individual intermediate gears 22 are rotatably supported by support pins 23 which are mounted on the revolution shaft 8.

On the other hand, the individual intermediate gears 22 mesh with a revolution radius changing gear 24 acting as an internal gear. This revolution radius changing gear 24 is formed in the inner circumference of the leading end portion of a cylindrical shaft 25. This cylindrical shaft 25 is fitted coaxially with the input shaft 14 on the outer circumference of the revolution shaft 8 and is rotatably held by a bearing 26.

On the outer circumference of the revolution shaft 8, as located on the outer circumference of the input shaft 14, there is fixed a revolution shaft gear 27. Adjacent to this revolution shaft gear 27, there is arranged an intermediate shaft gear 28 which is fixed on the aforementioned cylindrical shaft 25. The revolution shaft gear 27 meshes with an input gear 30 in a differential mechanism 29, and the intermediate shaft gear 28 meshes with an output gear 31 in the differential mechanism 29.

Figure 3:
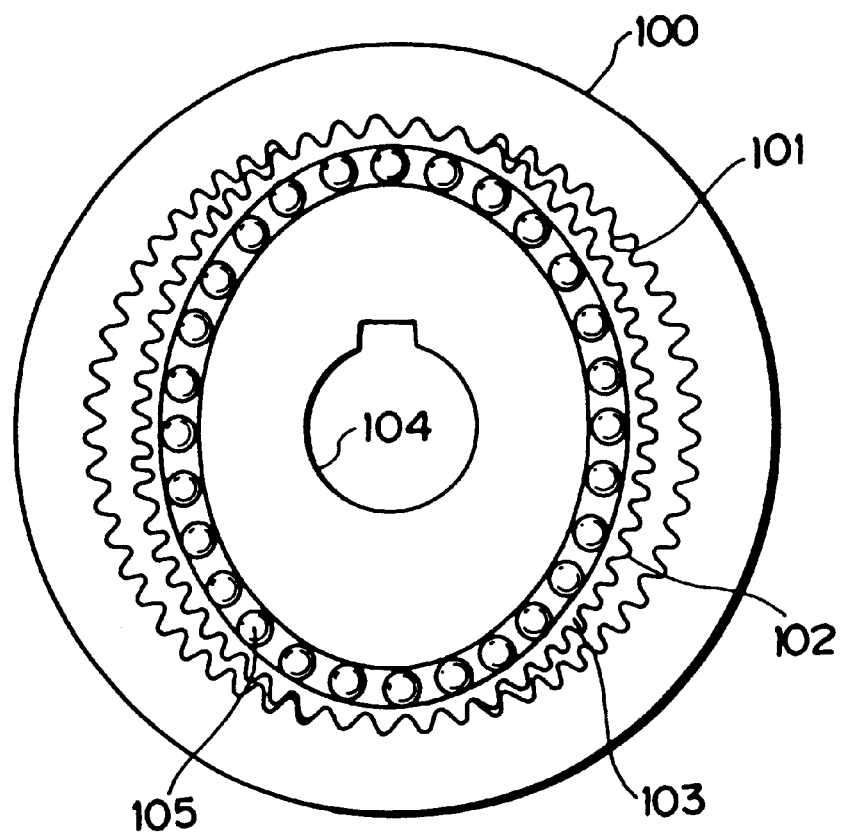
FIG. 3 is a mechanical diagram for explaining a fundamental mechanism employed in a differential mechanism.

Here will be described this differential mechanism 29. The differential mechanism 29 is constructed by making use of the mechanism having a construction shown in FIG. 3. In FIG. 3, more specifically, a ring-shaped member 100 is splined in its inner circumference to have teeth 101, and external teeth 102 having a smaller number of teeth than the teeth 101 are formed on a flexible ring 103 which is rotatably arranged in the inner circumference of the ring-shaped member 100. In the inner circumference of the flexible ring 103, there is arranged through a bearing 105 an elliptical rotary member 104, which has two longer-diametrical end portions pushing the flexible ring 103 into meshing engagement with the teeth 101 of the ring-shaped member 100. In the mechanism shown in FIG. 3, therefore, the number of teeth of the flexible ring 103 is less than that of the ring-shaped member 100. As a result, even when the flexible ring 103 makes one rotation, the ring-shaped member 100 does not make one rotation to have the angle of rotation which is reduced by the difference in the number of teeth.

Figure 4:
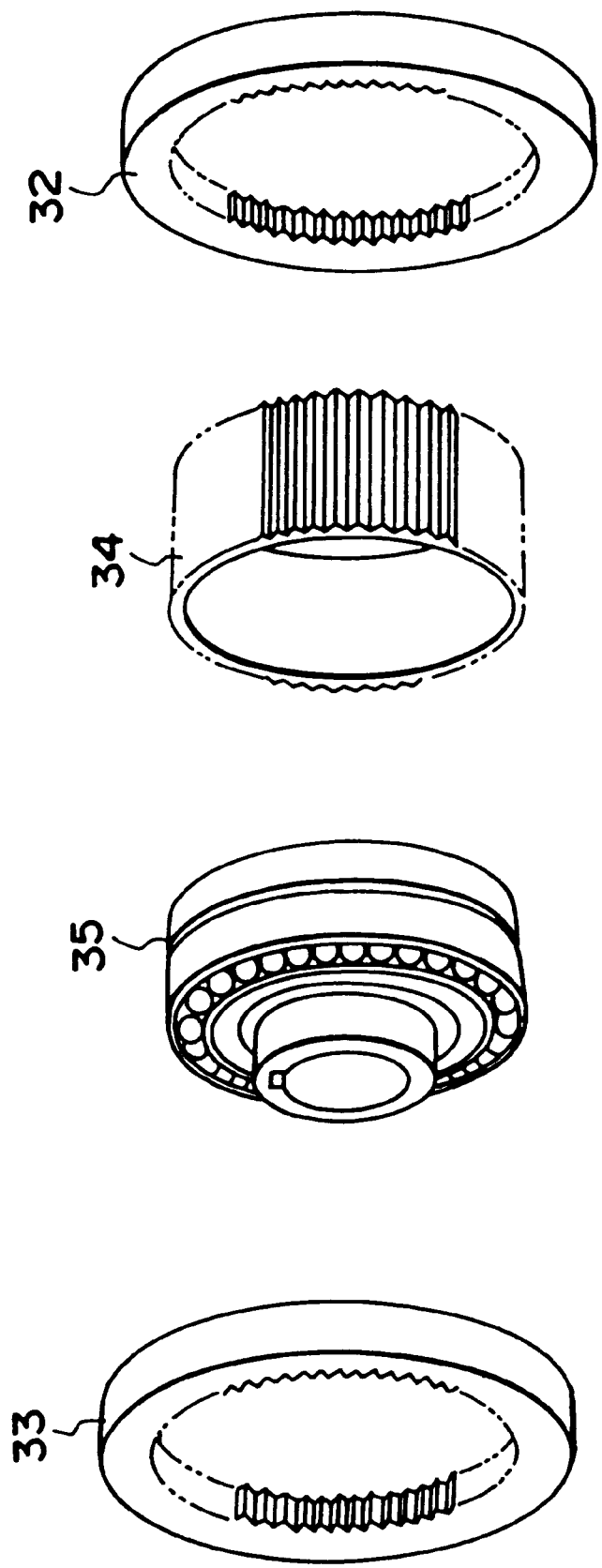
FIG. 4 is an exploded schematic view of the components of the differential mechanism.

FIG. 4 shows the differential mechanism 29 schematically in an exploded view. This differential mechanism 29 includes: a pair of circular splines 32, 33 corresponding to the aforementioned ring-shaped member 100; a flexible spline 34 corresponding to the aforementioned flexible ring 103 to mesh with those circular splines 32 and 33; and a wave generator 35 fitted in the inner circumference of the flexible spline 34 and corresponding to the elliptical rotary member 104. More specifically, the differential mechanism 29 includes: the paired cylindrical circular splines 32 and 33 having the splined inner circumferences; the flexible spline 34 made of a flexible cylindrical member and splined in its outer circumference to mesh with the splined teeth of the circular splines 32 and 33; and the wave generator 35 equipped with an elliptical cam having an outer periphery fitting a ball bearing which fits the flexible spline 34 on its outer periphery.

One circular spline 32 is set to have a number of teeth (e.g., 200) equal to that of the flexible spline 34 and is fitted and fixed in the inner circumference of the input gear 30. On the other hand, the other circular spline 33 is set to have a slightly larger number of teeth (e.g., 202) than the flexible spline 34 and is fitted and fixed in the inner circumference of the output gear 31. Moreover, the wave generator 35 is fixed on an adjusting shaft 36, which is connected to a radius changing motor M2. Here, this radius changing motor M2 is fixed on the housing 7 corresponding to the base portion.

In this differential mechanism 29, therefore, when the input gear 30 is rotated with the wave generator 35 or the adjusting shaft 36 being fixed, the flexible spline 34 rotates at the same rotation number as that of the input gear 30, because the number of teeth of the circular spline 32 fixed in the input gear 30 is equal to that of the flexible spline 34. On the contrary, the number of teeth of the circular spline 33 fixed in the output gear 31 is larger than that of the flexible spline 34, so that the output gear 31 is decelerated to rotate according to the difference in the number of teeth. In the embodiment thus far described, the flexible spline 34 has the number of teeth "200" whereas the circular spline 33 has the number of teeth "202", so that the output gear 31 is decelerated to rotate at a ratio of 200/202=100/101.

Thus, there arises a difference in the number of rotations, but, even in such a case, a ratio of number of teeth between the input gear 30 and the revolution shaft gear 27 and a ratio of number of teeth between the output gear 31 and the intermediate shaft gear 28 are so set that the revolution radius of the spindle 4 may not change. When the input gear 30 has the number of teeth "100" whereas the revolution shaft gear 27 has the number of teeth "200", for example, the output gear 31 is set to have the number of teeth "101" whereas the intermediate shaft gear 27 is set to have the number of teeth "200". In the case of this construction, the input gear 30 is rotated at 101 rpm, for example, with the adjusting shaft 36 or the wave generator 35 being fixed. Then, the output gear 31 rotates at 100 rpm whereas the revolution shaft gear 27 rotates at 101/2 rpm. Moreover, the output gear 31 rotates at 100 rpm so that the meshing intermediate shaft gear 28 rotates at 100×101=101/2 rpm. In short, the revolution shaft gear 27 and the intermediate shaft gear 28 rotate at an equal speed.

Therefore, the number of rotations of the revolution shaft 8 and the number of rotations of the cylindrical shaft 25 become equal. As a result, there rotate altogether the revolution radius changing gear 24 formed on the cylindrical shaft 25, the intermediate gears 22 meshing with the first gear 24, and the ring-shaped gear 21 meshing with the second gears 22. In short, the phases of the individual rollers 16 and 19 are kept constant in the direction of revolution.

Because of the difference in the number of teeth between the flexible spline 34 and the circular spline 33 on the side of the output gear 31, on the other hand, the circular spline 33 is decelerated at a rate corresponding to the difference in the number of teeth with respect to the rotation of the flexible spline 34. In the aforementioned embodiment, the difference in the number of teeth is "2", so that the circular spline 33 is decelerated at a rate of 2/200=1/100 with respect to the rotation of the flexible spline 34. In other words, when the flexible spline 34 is rotated at 100 rpm together with the adjusting shaft 36, the circular spline 33 relatively rotates at minus (−) 1 rpm. Here, no difference occurs in the number of rotations between the circular spline 32 on the side of the input gear 30 and the flexible spline 34, because they have an equal number of teeth. After all, when the flexible spline 34 is rotated together with the adjusting shaft 36, a difference occurs between the rotational phases of the input gear 30 and the output gear 31. In other words, it is possible to establish the relatively rotational motions between the input gear 30 and the output gear 31 at the rotational speed of 1/100 of the number of rotations of the adjusting shaft 36.

This relative rotation appears as a relative rotation between the revolution shaft 8 and the ring-shaped gear 21, namely, as a relative speed of revolutions between the individual rollers 16 and 19. Moreover, these relative revolutions between the individual rollers 16 and 19 change the eccentricity of the spindle 4 to the input shaft 14, i.e., the revolution radius, so that the apparatus thus far described can make it easy to adjust the revolution radius finely. Here, reference numeral 37 in FIG. 1 designates a revolution gear, which meshes with the aforementioned input gear 30. To this revolution gear 37, moreover, there is connected a revolution motor M3, which is fixed on the housing 7. On the other hand, the aforementioned revolution radius changing motor M2, the differential mechanism 29, the line for transmitting the torque from the differential mechanism 29 to the revolution shaft 8, and the line for transmitting the torque from the differential mechanism 29 to the eccentric shaft 10 construct a revolution radius changing mechanism altogether.

In the cutting apparatus shown in FIG. 1, moreover, the revolutions of the spindle 4 are achieved not by the combination of the linear motions in the two-dimensional directions but by the rotations of the revolution shaft 8 enclosing the spindle 4 so that the spindle 4 can be rotated and revolved at high speeds. In the aforementioned example, on the other hand, the eccentricity of the spindle 4 to the revolution shaft 8 can be changed by the rotation of the eccentric shaft 10, so that the revolution radius of the spindle 4 can be changed. It is, therefore, possible to easily perform the cutting operations of tapered holes, the boring operations for a plurality of kinds of different internal diameters, and the recessing operations.

Here will be described the actions of the aforementioned working apparatus and one embodiment of a machining method of the invention. In the cutting apparatus according to the invention, as has been described hereinbefore, the spindle motor M1 and the revolution motor M3, as individually fixed, are activated. Then, the spindle 4, i.e., the tool 1 attached thereto revolves while rotating on its axis so that the speed of revolutions can be made higher than that of the prior art. Accordingly, the ratio $K(=Nr/Na)$ of the number or rotations Nr and the number of revolutions Na of the tool 1 can be suitably set within a range from "1" to the number of rotations Nr and the number of "several hundreds", for, example. Moreover, that ratio K exerts serious influences upon the tool life, the working efficiency and the roughness of the worked surface, of which the tool life is highly influenced by the cutting speed. On the basis of these requirements and the restrictive conditions, therefore, the rotation/revolution ratio K and the cutting width fz per blade are determined.

Specifically, the cutting speed V is expressed by the sum (in the following Formula (1)) of a speed Vr of the rotation of the tool 1 and a speed Va of the revolution of the tool 1:

$$V=Vr+Va \tag{1}$$

Here, it is assumed that the tool 1 has a diameter DT whereas a bore to be cut by the tool 1 has an internal diameter DW. Then, the cutting speed Vr of the rotating tool 1 and the cutting speed Va of the revolving tool 1 are determined by the following Formulas (2) and (3):

$$Vr=(Nr-Na)\times\pi DT \tag{2}$$

and $$Va=Na\times\pi DW \tag{3}$$

Hence, the number of rotations Nr and the number of revolutions Na are expressed by the following Formulas (4) and (5):

$$Nr=V\times K/\pi(DW+DT\times(K-1)) \tag{4}$$

and $$Nr=V/\pi(DW+DT\times(K-1)) \tag{5}$$

On the other hand, the cutting amount (or the working efficiency) Q per unit time is expressed by the following Formula (6). Here, letter A designates the sectional area of a machining allowance, that is, the product of the depth of a cut to be made by the cutting blade and the average circumferential length of the inner and outer circumferences of the cut portion.

$$Q=Na\times Fz\times A \tag{6}$$

This is expressed in the following by employing the aforementioned ratio K:

$$Q=V\times fz\times A/\pi(DW+DT\times(K-1)) \tag{7}$$

Figure 5:
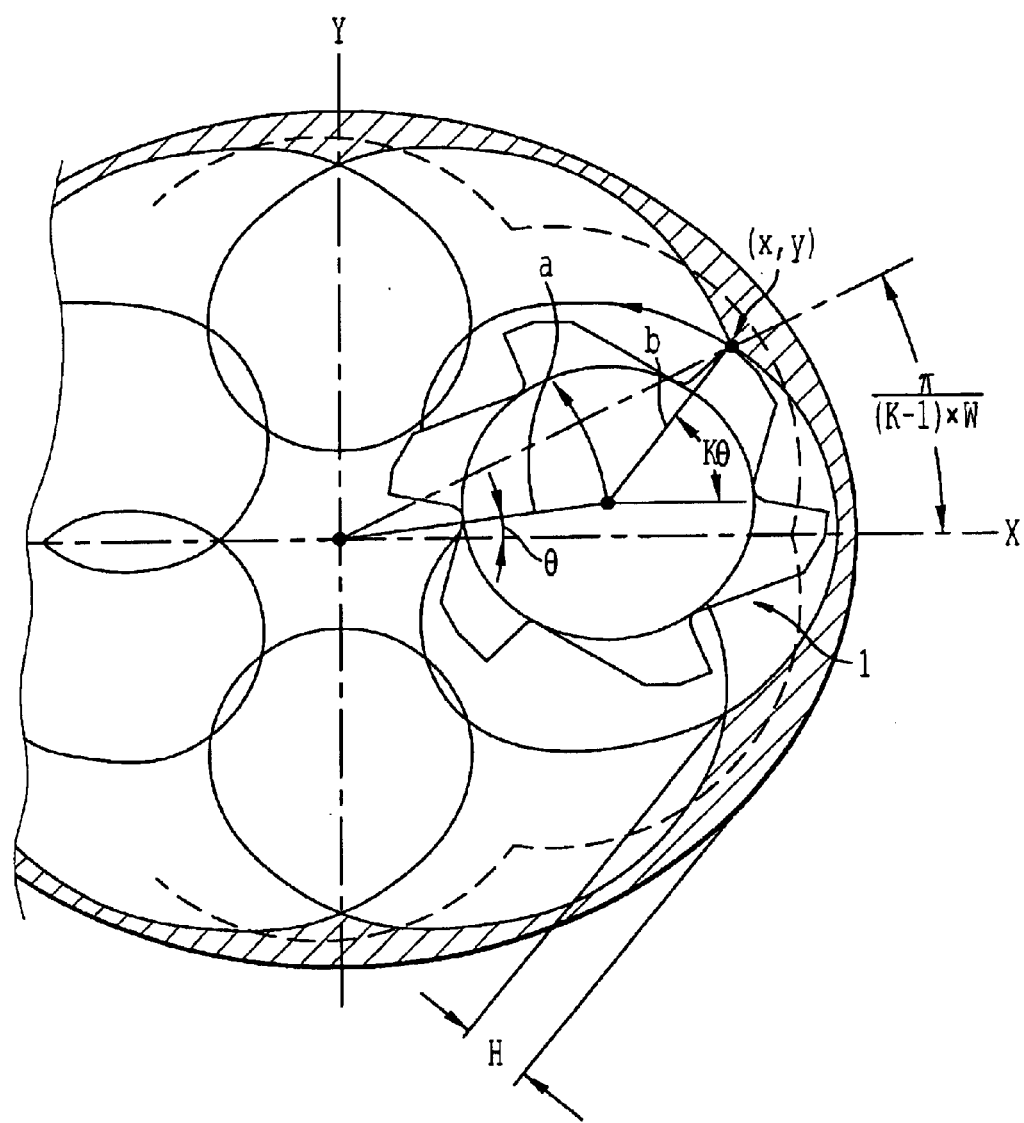
FIG. 5 is a diagram for explaining the working roughness in X–Y coordinates.

Here will be described the roughness of the worked surface. When the cutting operation is performed by rotating and revolving the tool 1, the tool 1 revolves to move slightly in the circumferential direction of the worked bore after any cutting blade cuts and before its subsequent cutting blade cuts. As a result, the locus of the blade edge is transferred to the worked surface so that undulations having continuous ridges and valleys are formed. The roughness of the worked surface is the worse for the larger height H of the ridges. These undulations are schematically shown in FIG. 5, from which the roughness H of the worked surface can be analyzed, as follows.

Specifically, X–Y coordinates are assumed by setting an origin at the center (i.e., the revolution center of the tool 1) of the worked bore and by setting an X-axis on a line joining the center of any valley and the origin and a Y-axis on a line intersecting the X-axis at a right angle. With these assumptions, the roughness H of the worked surface is expressed by the following Formula (8):

$$H = DW/2 - \sqrt{(x^2 + y^2)} \qquad (8).$$

Here, x and y designate the individual coordinates of the ridges. Hence, these coordinate values x and y are expressed by the following Formulas (9) and (10), respectively:

$$x = a \cdot \cos(\theta) + b \cdot \cos(k\theta) \qquad (9);$$

and $$y = a \cdot \sin(\theta) + b \cdot \sin(k\theta) \qquad (10).$$

Here: letter "a" designates a revolution radius of the center of the tool 1; letter "b" designates a rotation radius of the blade edge; and letter θ designates a revolution angle, as expressed in the following:

$$a = (DW - DT)/2 \qquad (11);$$

and $$b = (DW - DT)/2 \qquad (12).$$

Here, the aforementioned coordinate values x and y are in the relation of the following Formula (13) so that the aforementioned revolution angle θ has to satisfy the Formula (13):

$$\tan^{-1} = y/x = \pi/((K-1) \times W) \qquad (13).$$

The denominator of the right side of the Formula (13) indicates the number (i.e., the number of polygons joining the ridges) of the ridges of the undulations which are formed by the rotations and revolutions of the tool 1. Moreover, the undulations are made because the ridges formed by the preceding cutting blade are partially cut by the succeeding cutting blade, so that the value W in the Formula (13) has a relation to the number of blades Z of the tool 1. When the cutting blade has a larger axial length (i.e., edge length) than the axial feed fz of the tool 1, the period (or phase) of each cutting blade in the preceding revolution shifts from that of each cutting blade in the current revolution. Then, the ridges of the undulations made by the preceding revolution are partially cut by the current revolution, so that the number of ridges (or the number of polygons) is further increased. Therefore, the value W in the Formula (13) relates to the discrepancy of the cutting period of each cutting blade for each revolution. If the numerical value indicating how many revolutions are required for the tool 1 to restore the original pitch by the discrepancy of the period is designated by B, the aforementioned value W is expressed by the following Formula (14):

$$W = (Z + B)/\text{Greatest Common Measure } (Z, B) \qquad (14).$$

Figure 7:
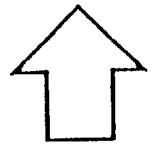
FIG. 7 is a diagram tabulating examples of the greatest common measures between the values B of the number of revolutions performed until the cutting period restores the original pitch and the number of blades, and the values W obtained therefrom.

The number of revolutions B to restore the original pitch indicates the number of ridges to be cut off, and its reciprocal (1/B) indicates the discrepancy of the period. If the rotation/revolution ratio K is an integer, on the other hand, the valleys of the undulations made by the preceding revolution are cut as valley portions at the current revolution by any cutting blade so that the number of ridges (or the polygonal number) is unvaried. If a numerical value (not an integer) having a fraction below a decimal point or the reciprocal (1/B) of the aforementioned number of revolutions B to restore the original pitch is adopted as the value of the rotation/revolution ratio K, more specifically, the cutting period by the cutting blade has discrepancies to increase the number of the ridges to be cut in the subsequent cutting procedures. The discrepancies (1/B) of period, the numbers of ridges (B) to be cut, and the discrepancies of the rotation/revolution ratio K are tabulated, for example, in FIG. 6. On the other hand, the values of the greatest common measures (Z, B) and the numerical values W determined thereon are tabulated in FIG. 7.

After all, as the values W become the larger, the phase difference between the valleys and the ridges of the undulations made by the cutting becomes the smaller. As the values W and the phase difference come to closer to each other, the height H of the ridges become smaller. In short, the undulations of the worked surface are reduced to improve the surface roughness. If the number of blades Z is a prime number, as tabulated in FIG. 7, the value W increases, so that the roughness of the worked surface can be improved without increasing the number of blades Z or reducing the feed of the tool 1.

Figure 8:
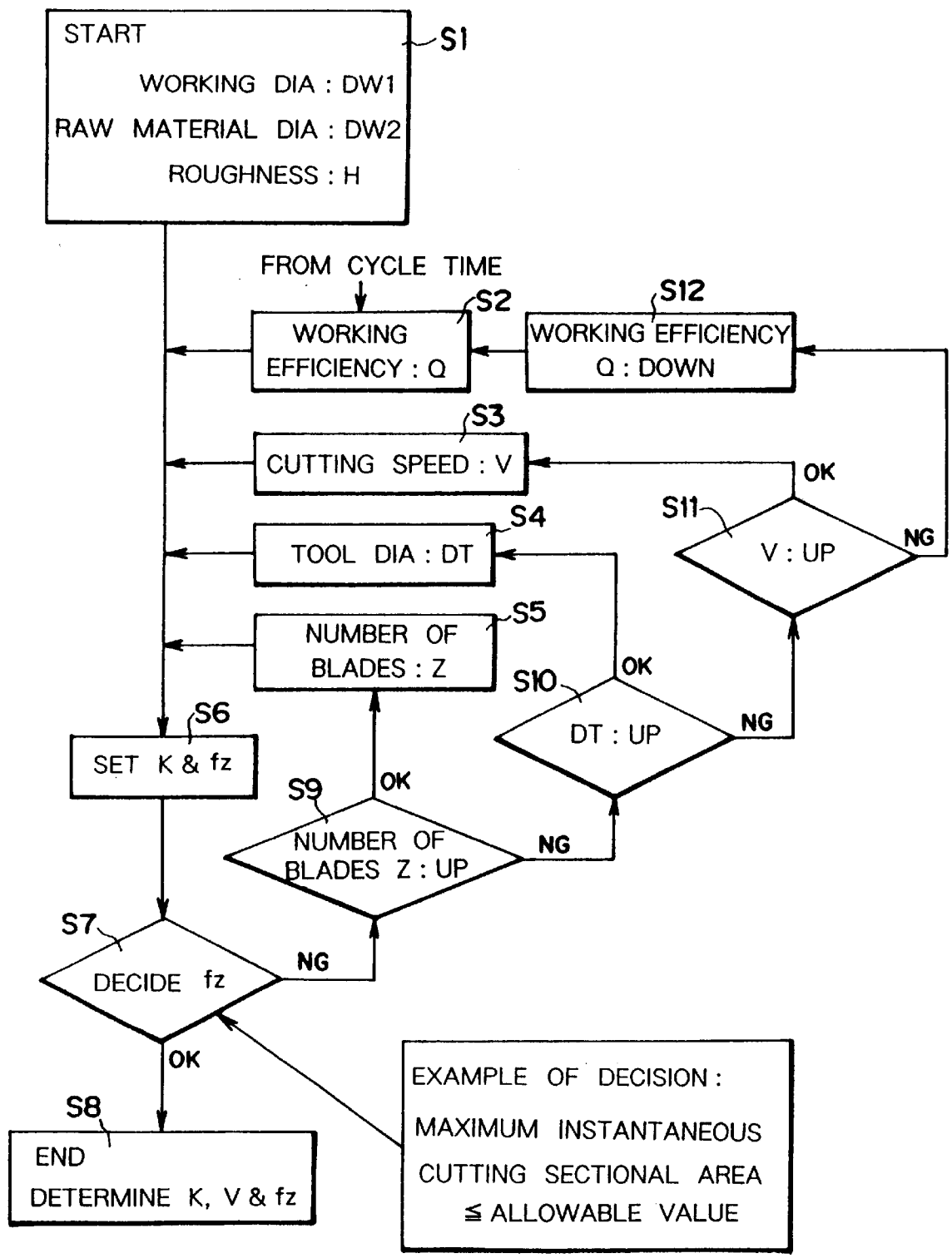
FIG. 8 shows one example of a flow chart for determining the cutting conditions.

FIG. 8 is a flow chart showing a process for determining the cutting conditions by making use of the aforementioned relations. This is exemplified by the case in which the internal diameter of a bore formed in a raw material is cut to a desired value. First of all, the internal diameter Dw1 of the bore to be worked, the internal diameter Dw2 of the bore of the raw material, and the surface roughness H are determined and read in (at Step S1) as the demanded items or the premised items. Moreover, the working efficiency Q is set (at Step S2) on the basis of the time (i.e., the cycle time) allowed for the working. The cutting speed V is set (at Step S3) according to the tool used. The tool diameter DT is read in (at Step S4), and the number of blades Z is further read in (at Step S5).

On the basis of these working conditions and tool conditions, there are determined (at Step S6) the rotation/revolution ratio K and the feed fz per revolution. Specifically, the relation of the Formula (7) holds among the working efficiency Q, the rotation/revolution ratio K and the feed fz per revolution, and the relations expressed by the Formulas (8) to (14) hold between the surface roughness H and the rotation/revolution ratio K. By introducing those working conditions and tool conditions into these Formulas, therefore, there are determined the rotation/revolution ratio K and the feed fz per revolution. When the surface roughness H set as one of the working conditions is small, a real number having a fraction below the decimal point is adopted as the rotation/revolution ratio K.

It is decided (at Step S7) whether or not the feed fz per revolution is proper. If this value is excessively large, the cut per one action is so deep as to raise the load on the cutting blade. Therefore, the feed fz is restricted by the strength of the cutting blade. Therefore, the propriety of the feed fz may be decided on whether or not the maximum instantaneous cutting sectional area to be determined, for example, by that feed fz is less than an allowable value. If the answer of Step S7 is affirmative, the rotation/revolution ratio K, the cutting speed V and the feed fz per revolution are adopted as cutting conditions (at Step S8).

If the feed fz per revolution is so large that the answer of Step S7 is negative, on the contrary, it is decided (at Step S9) whether or not the number of blades Z can be increased. That is, it is decided whether or not there is a tool having a large number of blades Z and whether or not it is possible to replace the tool.

When the number of blades Z can be enlarged, the rotation/revolution ratio K and the feed fz per revolution are calculated on the basis of the number of blades Z, and the propriety of the calculated feed fz is decided. In short, there are repeated the operations of the aforementioned Steps S6 and S7.

When the answer of Step S9 is negative because there is not the tool having a large number of blades Z, on the other hand, it is decided whether or not the tool can be replaced by another having a larger diameter. In other words, it is decided (at Step S10) whether or not the tool diameter DT can be enlarged. When the answer of Step S10 is affirmative because the tool diameter DT can be enlarged, the rotation/revolution ratio K and the feed fz per revolution are calculated on the basis of that tool diameter DT, and the propriety of the feed fz is decided. In short, there are repeated the operations of the aforementioned Steps S6 and S7.

When the answer of Step S10 is negative because there is not a tool having a larger diameter, on the contrary, it is decided (at Step S11) whether or not the cutting speed V can be increased. If a maximum value is not set at first as the cutting speed V, this speed V can be increased. In this case, the answer of Step S11 is affirmative. On the basis of this increased cutting speed V, moreover, the rotation/revolution ratio K and the feed fz per revolution are calculated again to decide the propriety of the calculated feed fz. In this case, too, there are repeated the operations of the aforementioned Steps S6 and S7.

When the cutting speed V cannot be increased, on the contrary, the working efficiency Q is lowered (at Step S12). On the basis of the updated working efficiency Q, the rotation/revolution ratio K and the feed fz per revolution are calculated to decide the propriety of the calculated feed fz. In short, there are repeated the operations of the aforementioned Steps S6 and S7.

Here in the flow chart shown in FIG. 8, when the answer of the decision on the feed fz per revolution is negative, the propriety of increasing the number of blades Z, the propriety of enlarging the tool diameter DT and the propriety of increasing the cutting speed V are decided in the recited order. However, this decision sequence may be voluntary, and the working efficiency Q may be lowered when all the answers of the decisions are negative.

Here will be enumerated examples of the machining apparatus and the machining method thus far described.

EXAMPLES

By employing a tool having a diameter DT of 60 mm and eight cutting blades (Z=8), a raw material bore having an internal diameter DW2 is worked to a worked bore having an internal diameter DW1. The tool is moved back and forth in the axial directions, while being rotated and revolved, to perform a rough working in the forward stroke and a finish machining in the backward stroke. The machining allowance in the radial direction is (DW1−DW2)/2=1.5 mm, of which 1.3 mm is roughly cut out and 0.2 mm is cut out at the finish machining. On the other hand, the roughness H of the worked surface is 0.2 mm for the rough working and 0.005 mm for the finish machining. Moreover, the working efficiency Q is 50 cc/min. for the coarse working and 7.4 cc/min. for the finish machining. These values approximate those of the working efficiency for the boring operations. On the other hand, the cutting speed V is 250 m/min.

Figure 9:
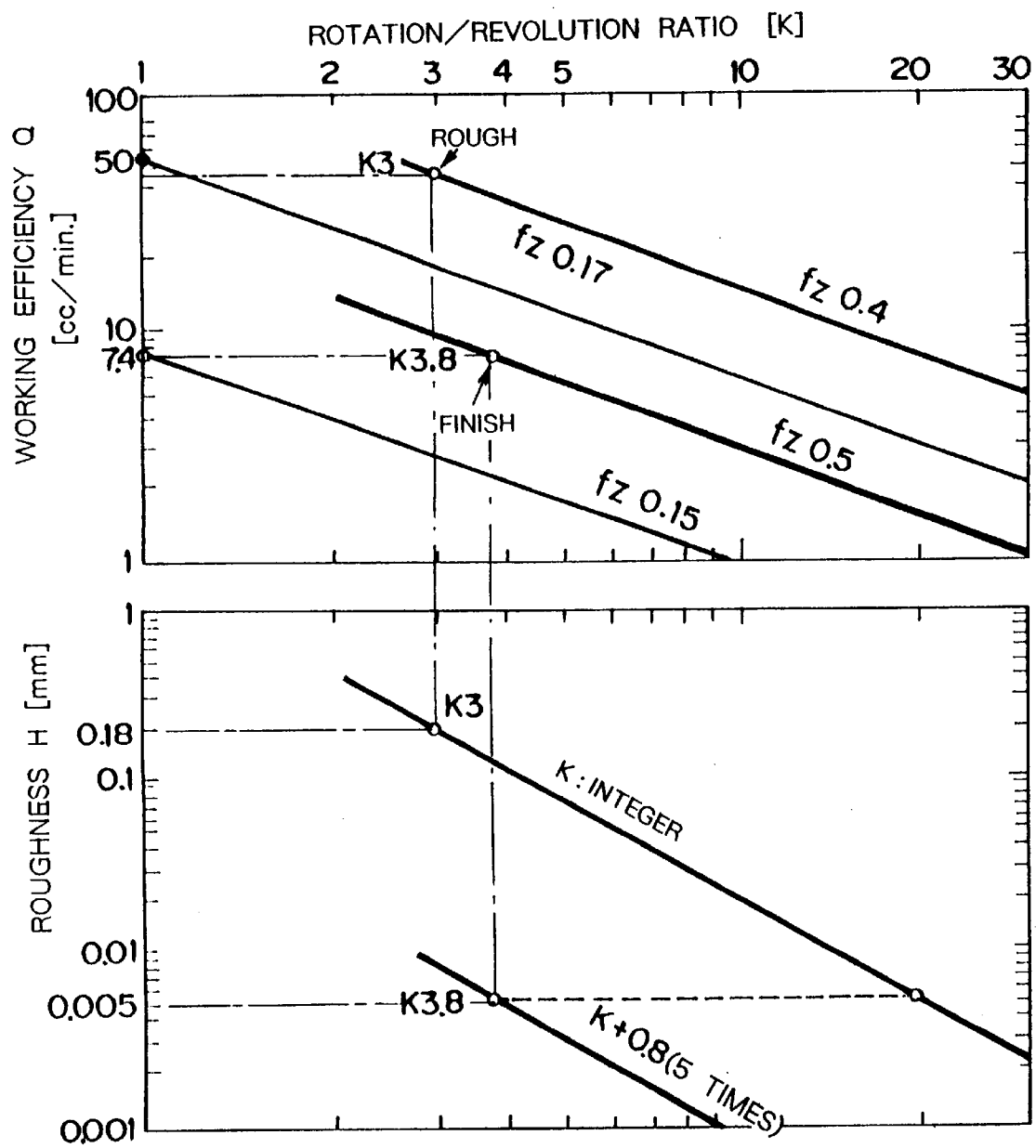
FIG. 9 shows both a map to be employed for determining the rotation/revolution ratio and the feed per revolution on the basis of the working efficiency and the roughness of the worked surface, and an example for employing the map.

Under these conditions, the relations among the working efficiency Q, the rotation/revolution ratio K and the feed fz per revolution are illustrated in FIG. 9, and the relations between the roughness H of the worked surface and the rotation/revolution ratio K are also illustrated in FIG. 9. There is set the value of 0.18 mm near the surface roughness H=0.2 mm, as required for the rough working, and the rotation/revolution ratio K=3 is tentatively adopted from the intersection with a line of "0.18" in the lower diagram of FIG. 9. Of the lines for the feed fz, as intersecting the rotation/revolution ratio K=3 in the upper diagram of FIG. 9, a line having an intersection near the required working efficiency of 50 cc/min. is located to find a feed fz=0.4 and a working efficiency Q=47 cc/min.

On the basis of the working efficiency Q=47 cc/min. and the surface roughness H of the worked surface=0.18 mm, as satisfying the required working conditions, there are determined the rotation/revolution ratio K=3 and the feed fz=0.4. Of these, the feed fz=0.4 is sufficiently allowable so that the rotation/revolution ratio K=3, the feed fz=0.4 and the cutting speed V=250 m/min. are adopted as the cutting conditions.

The conditions for the finish machining are likewise determined. In the lower diagram of FIG. 9, more specifically, the rotation/revolution ratio K=3.8 (=3+0.8 (5 times)), as intersecting the line of the surface roughness H=0.005 mm, is tentatively adopted. In the upper diagram of FIG. 9, the line of the feed fz, as extending through the intersection of the individual lines for the rotation/revolution ratio K=3.8 and for the required working efficiency Q=7.4 cc/min., is located to find fz=0.5. Of these, the feed fz=0.5 is sufficiently allowable so that the rotation/revolution ratio K=3.8, the feed fz=0.5 and the cutting speed V=250 m/min. are adopted as the conditions of the finish cutting.

At the finish machining, therefore, the period shifts by ⅕ as the tool (or an end mill) makes one revolution. Therefore, the ridges, as formed at the preceding revolution, are cut out at the current revolution, and these cutting procedures are repeated till the tool makes five revolutions. As a result, the height H of the ridges, i.e., the factor for deteriorating the surface roughness is reduced to improve the surface roughness.

Here, if the cutting speeds both for the rough working and for the finish machining are set to 250 m/min., assuming that the aforementioned bore is bored for the sake of comparisons, the rough working has a working efficiency of 50 cc/min. (fz=0.17 mm per revolution), and the finish machining has a working efficiency of 7.4 cc/min. (fz=0.15 mm per revolution) and a surface roughness H=6.3 μm. According to the apparatus and method of the invention thus far described, it is possible to achieve a working efficiency and a surface roughness comparable to those of the boring and to complete the rough working and the finish machining by moving a single end mill back and forth in the axial directions. Therefore, it is possible to perform the efficient and accurate workings without raising the load on a tool, i.e., without shortening the tool life.

Here will be explained the relations between the invention and the aforementioned specific examples. The revolution motor M3 and the spindle motor M1, as shown in FIG. 1, construct rotation/revolution ratio changing means, and the functional means of Step S6, as shown in FIG. 8, corresponds to rotation/revolution ratio setting means of the invention.

Figure 10:
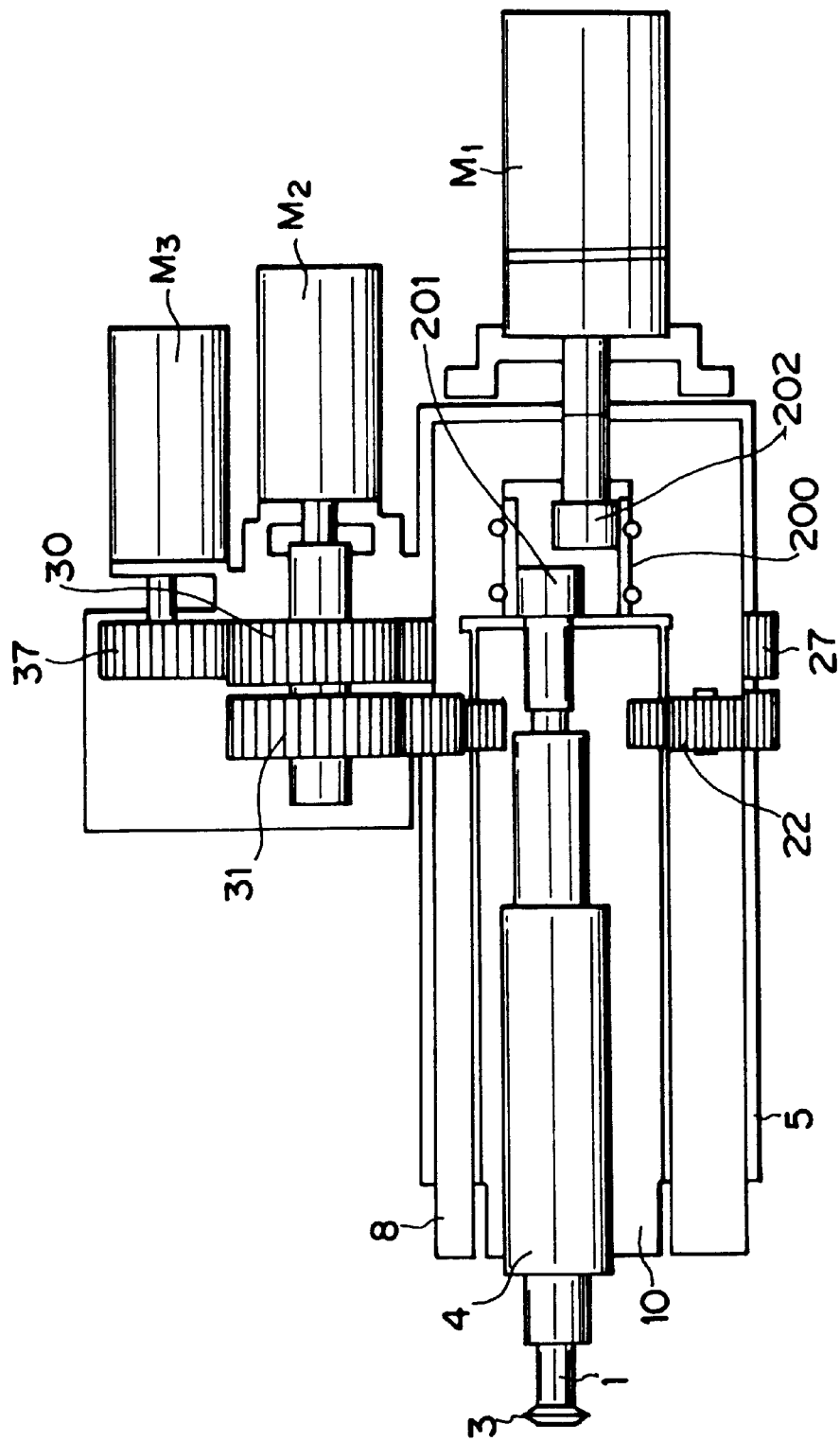
FIG. 10 is a diagram showing another embodiment of the apparatus of the invention schematically.

Here, the apparatus of the invention is sufficient, if it can rotate and revolve the tool and can change, the number of revolutions, but should not be limited to the structure shown in FIG. 1. As shown in FIG. 10, more specifically, on the common axis of the eccentric shaft 10, there is rotatably disposed an internal gear 200, which meshes with both an external gear 201 mounted on the spindle 4 and an external gear 202 mounted on the spindle motor M1. The remaining constructions may be identical to those shown in FIG. 1.

According to the apparatus and method of the invention thus far described, the worked surface can be formed to have undulations, the width and depth of which can be controlled by the rotation/revolution ratio. Specifically, the width L is expressed, as follows:

$$L = \pi \times DW/(K-1) \times W \quad (15);$$

and the depth H is expressed, as follows:

$$H = DW/2 - \sqrt{(x^2 + y^2)} \quad (16).$$

Figure 11:
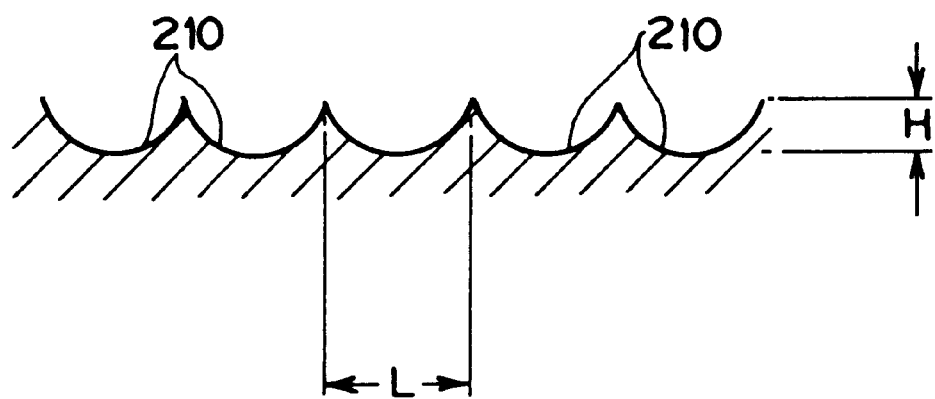
FIG. 11 is a partially enlarged diagram showing an example of oil sumps to be formed by the apparatus and method of the invention.
Figure 12:
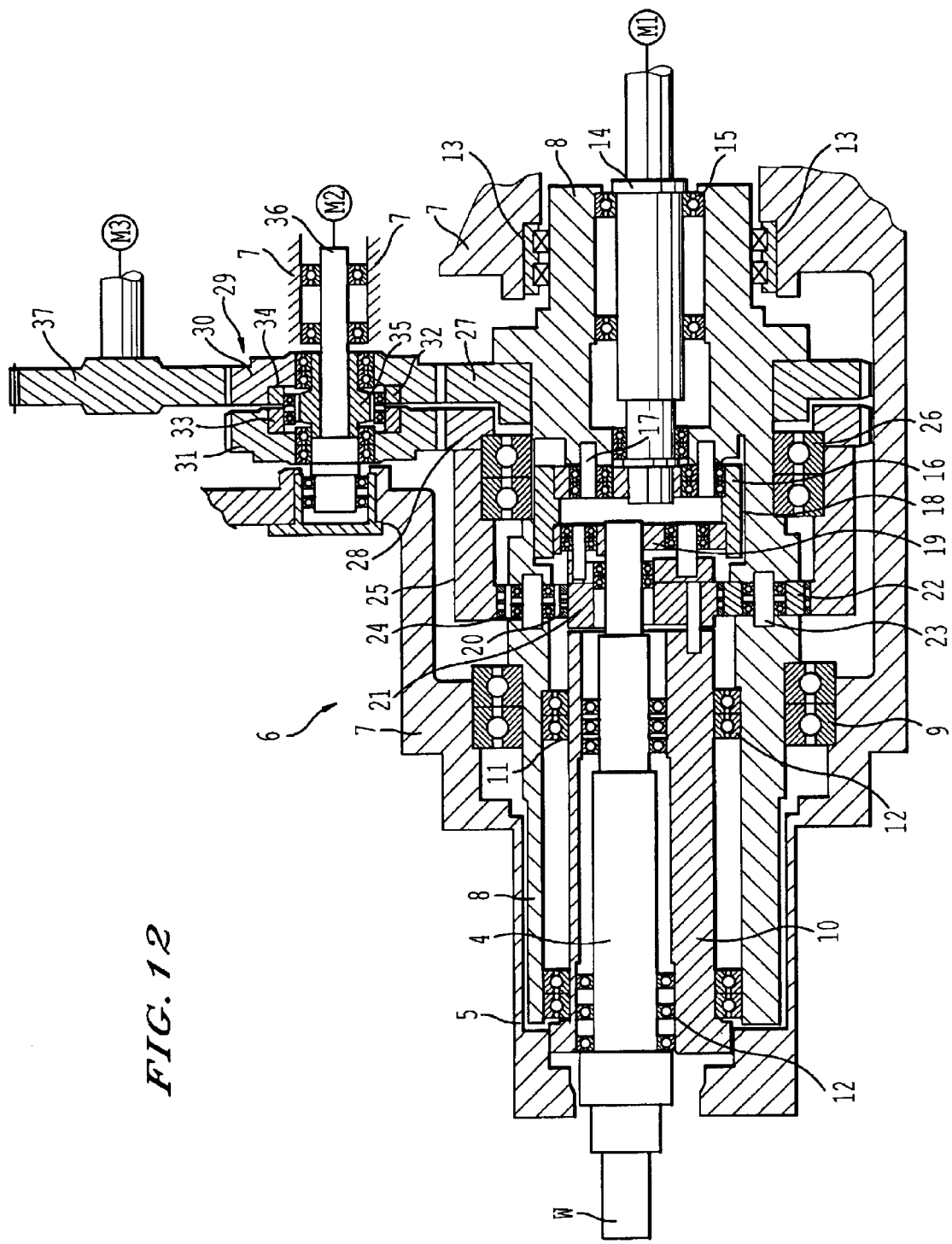
FIG. 12 is a sectional view showing one embodiment of an apparatus according to the present invention with a rotating workpiece W.

If the undulations thus controlled are made on the cylindrical worked surface, they can be used as oil sumps for the cylindrical sliding surface. These oil sumps, as designated by 210, are schematically shown in FIG. 11.

According to the invention, on the other hand, the working can be performed without any burr. When the cylindrical surface is to be cut, for example, as has been described hereinbefore, a rough working is performed in the forward stroke and a finish machining is performed in the backward stroke. More specifically, the tool moves in the forward stroke so far as to go through a cylindrical portion to be worked, thereby causing the end of the cylindrical portion to be burred. The working in the backward stroke starts from the burred end portion so that the axial end portion of the worked cylindrical surface is deburred. In short, the deburring operation can be performed by moving the tool over the range from end to end of a workpiece. Either stroke may be likewise exemplified by the rough or finish machining.

Here, the foregoing specific embodiment has been described on the case in which the cutting operation is performed by rotating and revolving the tool. However, the invention should not be limited to the specific embodiment but may be applied to any apparatus or method, if either the tool or the workpiece rotates and revolves so that the workpiece may be machined. On the other hand, the mechanism for rotating and revolving the tool may be other than the construction shown in FIG. 1.

Here will be synthetically described the advantages of the invention. According to the invention, as has been described hereinbefore, the workpiece or the tool rotates and revolves for performing the working operation so that the working operation is intermittently performed to form in the worked surface the valleys where the tool has acted most deeply and the ridges between the valleys. Since the ratio of the number of rotations to the number of revolutions is given a numerical number having a fraction below a decimal point, however, the ridges, as formed at the preceding revolution, are worked as the valleys or their portions at the current revolution. As a result, less portions are left as the ridges to improve the roughness of the worked surface. By reducing the ratio of the number of rotations to the number of revolutions, on the other hand, the ratio of the speed by the revolution in the working speed of the tool can be increased to make the working efficient. On the other hand, the intermittent working makes it possible to retain a non-working time period during the rotation of the tool thereby to elongate the life of the tool and lower the cost of tools.

According to the invention, on the other hand, the ridges of the undulations, as made on the worked surface, are worked by a subsequent revolution so that the height of the ridges, i.e., the size of the undulations can be reduced. Therefore, the working can be excellently performed in both the working efficiency and the roughness of the worked surface while elongating the tool life.

According to the invention, moreover, the relative feed of the tool by the revolution of the workpiece or the tool can be given a value reflecting the amount of working per unit time, i.e., the working efficiency and the roughness of the worked surface. As a result, the speed of revolutions can be optimized to improve the working efficiency and the roughness of the worked surface.

According to the invention, the working is performed by rotating and revolving the workpiece or the tool so that its operation is made intermittent so that the valleys where the tool acts most deeply and the ridges between the valleys are formed on the worked surface. Since the ratio of the number of rotations to the number of revolutions is given a numerical value having a fraction below a decimal point, however, the ridges, as formed at the preceding revolution, are worked as the ridges or their portions at the current revolution so that the ridges are less left to improve the surface roughness of the worked surface. On the other hand, the number of revolutions can be changed to increase the relative feed of the tool to the workpiece. As a result, the working efficiency can be improved to elongate the life of the tool.

According to the invention, still moreover, the feed of the tool by the revolution of the workpiece or the tool can be given a value reflecting the amount of working per unit time, i.e., the working efficiency and the roughness of the worked surface. As a result, the speed of revolutions can be optimized to improve the working efficiency and the roughness of the worked surface.

According to the invention, furthermore, the oil sumps in the frictional sliding surface can be worked by the cutting operation, and their shapes can be properly set by controlling the speeds.

What is claimed is:

1. A machining apparatus for machining a workpiece, comprising:
    means for rotating and revolving a tool to contact the workpiece;
    ratio changing means for changing a ratio between a number of rotations of the tool and a number of revolutions of the tool; and
    rotation-and-revolution setting means for setting said ratio such that said tool rotates plural times while revolving one turn so that ridges of undulations, as made on a worked surface, overlap valleys of the undulations, as formed in the worked surface during a subsequent revolution.

2. A machining apparatus as set forth in claim 1,
    wherein said rotation-and-revolution setting means includes means for setting said ratio on the basis of an amount of machining per unit time and a roughness of a worked surface.

3. A machining apparatus as set forth in claim 1,
    wherein said rotation-and-revolution setting means includes means for setting said ratio to a numerical value of a rational number on the basis of a roughness of a worked surface.

4. A machining method for machining a workpiece, comprising steps of:
    providing a machining apparatus comprising means for rotating and revolving a tool to contact the workpiece, and changing means for changing a ratio of a number of rotations of the tool to a number of revolutions of the tool; and
    setting said ratio such that the tool rotates plural times while revolving one turn so that ridges of undulations, as made on a worked surface, overlap valleys of the undulations, as formed in the worked surface during a subsequent revolution.

5. A machining method as forth in claim 4, wherein said ratio is set on the basis of an amount of machining per unit time and a roughness of the worked surface.

6. A machining method as set forth in claim 4, wherein said ratio is set to a numerical value of a rational number on the basis of a roughness of the worked surface.

7. A machining apparatus for machining a workpiece, comprising:

means for rotating and revolving the workpiece to contact a tool;

ratio changing means for changing a ratio between a number of rotations of the workpiece and a number of revolutions of the workpiece; and rotation-and-revolution setting means for setting said ratio such that said workpiece rotates plural times while revolving one turn so that ridges of undulations, as made on a worked surface, overlap valleys of the undulations, as formed in the worked surface during a subsequent revolution.

8. A machining apparatus as set forth in claim 7, wherein said rotation-and-revolution setting means includes means for setting said ratio on the basis of an amount of machining per unit time and a roughness of a worked surface.

9. A machining apparatus as set forth in claim 7, wherein said rotation-and-revolution setting means includes means for setting said ratio to a numerical value of a rational number on the basis of a roughness of a worked surface.

10. A machining method for machining a workpiece, comprising steps of:

providing a machining apparatus comprising means for rotating and revolving the workpiece to contact a tool, and changing means for changing a ratio for a number of rotations of the workpiece to a number of revolutions of the workpiece; and setting said ratio such that the workpiece rotates plural times while revolving one turn so that ridges of undulations, as made on a worked surface, overlap valleys of the undulations, as formed in the worked surface during a subsequent revolution.

11. A machining method as set forth in claim 10, wherein said ratio is set on the basis of an amount of machining per unit time and a roughness of the worked surface.

12. A machining method as set forth in claim 10, wherein said ratio is set to a numerical value of a rational number on the basis of a roughness of the worked surface.

* * * * *